US012671269B2

(12) United States Patent
Shimizu et al.

(10) Patent No.: US 12,671,269 B2
(45) Date of Patent: *Jun. 30, 2026

(54) PRINTING DEVICE

(71) Applicant: SEIKO EPSON CORPORATION, Tokyo (JP)

(72) Inventors: Michihiro Shimizu, Asahi-mura (JP); Hiroaki Kasuga, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/001,620

(22) Filed: Dec. 26, 2024

(65) Prior Publication Data

US 2025/0219449 A1     Jul. 3, 2025

(30) Foreign Application Priority Data

Dec. 28, 2023    (JP) ................................. 2023-222966

(51) Int. Cl.
| | |
|---|---|
| *H02J 50/10* | (2016.01) |
| *B41J 2/32* | (2006.01) |
| *B41J 3/36* | (2006.01) |
| *B41J 29/13* | (2006.01) |
| *H02J 50/90* | (2016.01) |

(52) U.S. Cl.
CPC ................. *H02J 50/10* (2016.02); *B41J 2/32* (2013.01); *B41J 3/36* (2013.01); *B41J 29/13* (2013.01); *H02J 50/90* (2016.02)

(58) Field of Classification Search
CPC .... H02J 50/10; H02J 50/90; B41J 2/32; B41J 3/36; B41J 29/13; B41J 29/023; B41J 29/393
See application file for complete search history.

(56) References Cited

U.S. PATENT DOCUMENTS

| | | | |
|---|---|---|---|
| 2011/0285765 A1* | 11/2011 | Lamontagne | ......... G06F 3/1236 |
| | | | 347/3 |
| 2012/0050448 A1 | 3/2012 | Sakaino | |
| 2016/0276862 A1* | 9/2016 | Herrmann | ............. H02J 7/0042 |
| 2023/0166530 A1 | 6/2023 | Shimizu et al. | |

FOREIGN PATENT DOCUMENTS

| | | |
|---|---|---|
| JP | 2012-045808 A | 3/2012 |
| JP | 2023-078600 A | 6/2023 |

* cited by examiner

*Primary Examiner* — Regis J Betsch
*Assistant Examiner* — Alex W Lam
(74) *Attorney, Agent, or Firm* — Spencer Fane LLP

(57) ABSTRACT

A printing device includes: a case having a roll paper housing unit in which a roll paper is housed; a cover coupled to the case and opening and closing the roll paper housing unit; a battery housing unit formed in the case; a battery housed in the battery housing unit; and a belt clip attached to the case, the belt clip including a power receiving module that receives a power transmission signal from outside by contactless power feeding and feeds power to the battery.

5 Claims, 6 Drawing Sheets

PRINTING DEVICE

The present application is based on, and claims priority from JP Application Serial Number 2023-222966, filed Dec. 28, 2023, the disclosure of which is hereby incorporated by reference herein in its entirety.

BACKGROUND

1. Technical Field

The present disclosure relates to a printing device.

2. Related Art

A portable printer that can be carried by a person is used.

Such a portable printer is carried and used by a bill collector or the like, for example, in meter reading of a public utility charge.

JP-A-2012-45808 describes a portable printer having a belt clip, and this portable printer has a battery housing unit which a battery is attachable to and removable from (see JP-A-2012-45808). The belt clip of this portable printer can be attached to pants or the like.

JP-A-2023-78600 describes a portable mobile printer, and this mobile printer is equipped with a unit that enables wireless power feeding (see JP-A-2023-78600).

JP-A-2012-45808 and JP-A-2023-78600 are examples of the related art.

However, in the portable printers according to the related art as described above, since the power receiving coil is generally arranged at the same surface as the surface where the battery is mounted, there is a case where the arrangement position of the belt clip is restricted. For example, in a configuration in which the belt clip is screw-fastened to the bottom surface, it may be necessary to align the positions of the power transmission coil and the power receiving coil in the state where the belt clip removed once, using a tool.

SUMMARY

According to an aspect of the present disclosure, a printing device includes: a case having a roll paper housing unit in which a roll paper is housed; a cover coupled to the case and opening and closing the roll paper housing unit; a battery housing unit formed in the case; a battery housed in the battery housing unit; and a belt clip attached to the case, the belt clip including a power receiving module that receives a power transmission signal from outside by contactless power feeding and feeds power to the battery.

DESCRIPTION OF EMBODIMENTS

Embodiments will now be described with reference to the drawings.

The drawings used below are for the sake of convenience of description. Note that the embodiments described below do not unduly limit the contents described in the claims. Also, not all of the elements described below are necessarily essential elements.

Also, for the sake of convenience of description, the names of constituent parts may be assigned ordinal numbers such as first and second, and the ordinal numbers are for the sake of convenience of specifying the respective constituent parts.

The electrical configuration of a mobile printer 1 will be described.

Figure 1:
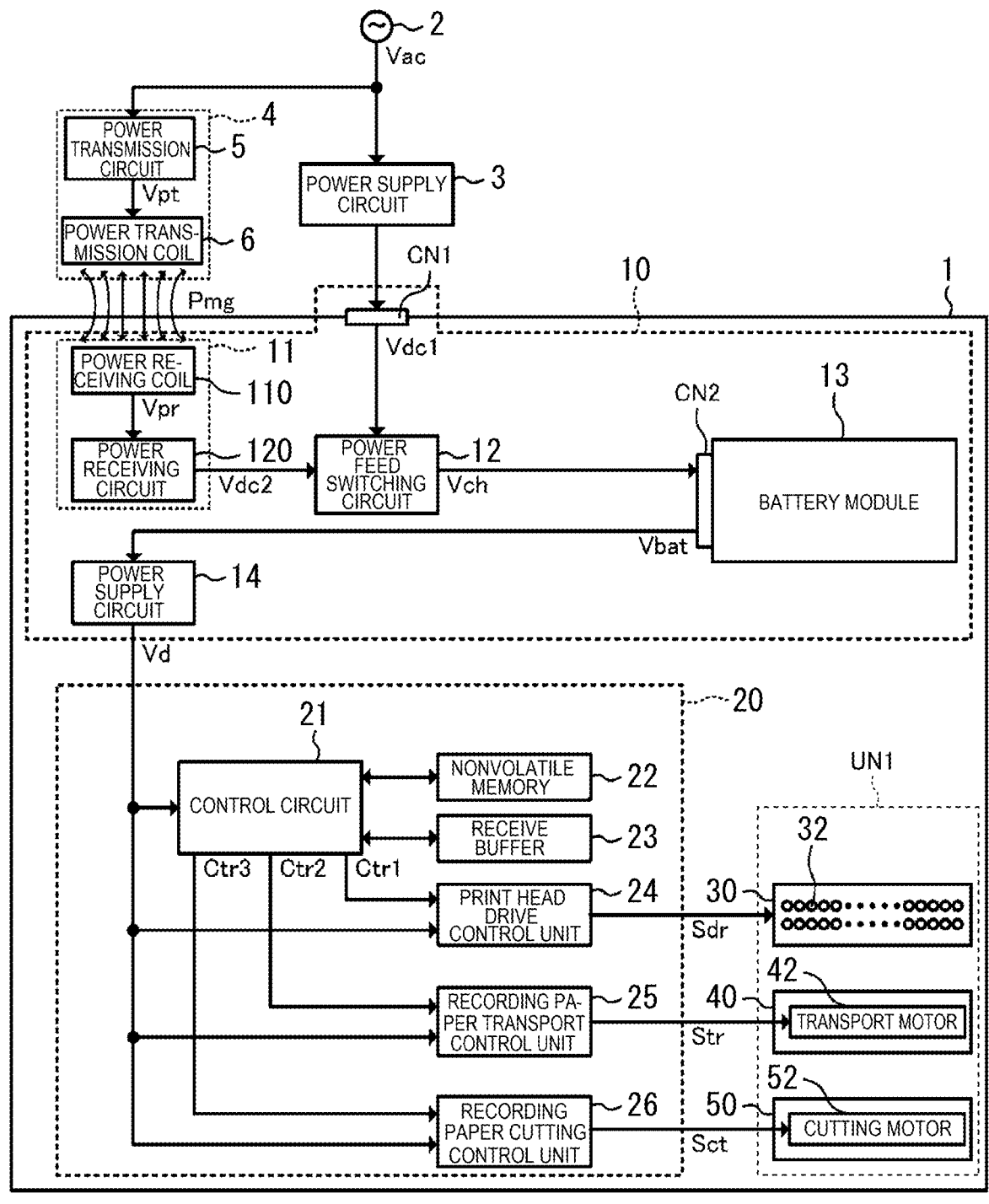
FIG. 1 shows the electrical configuration of a mobile printer.

FIG. 1 shows the electrical configuration of the mobile printer 1. The mobile printer 1 according to the present embodiment is a so-called thermal printer in which a thermal head including a plurality of heating elements applies heat to a surface of a heat-sensitive paper as a recording medium to print a desired character, image, or the like on the recording medium. In addition to the mobile printer 1 according to the present embodiment, FIG. 1 also illustrates a commercial power supply 2, a first power supply circuit 3, and a power transmission unit 4 as external devices that supply drive power from outside the mobile printer 1.

In the present embodiment, a case where the mobile printer 1 is a thermal printer having a thermal head as a print head is described, but in another example, the mobile printer 1 may be an inkjet printer having an inkjet head as a print head.

The commercial power supply 2 generates a power supply voltage signal Vac, which is an AC voltage with a commercial frequency, and supplies the power supply voltage signal Vac to each of the first power supply circuit 3 and the power transmission unit 4.

The first power supply circuit 3 converts the supplied power supply voltage signal Vac into a first DC voltage signal Vdc1 having a predetermined voltage value, and supplies the first DC voltage signal Vdc1 to the mobile printer 1. That is, the mobile printer 1 is supplied with drive power corresponding to the first DC voltage signal Vdc1. The first power supply circuit 3 includes a converter circuit such as a flyback circuit.

The power transmission unit 4 includes a power transmission circuit 5 and a power transmission coil 6. The power transmission circuit 5 converts the frequency of the power supply voltage signal Vac supplied from the first power supply circuit 3 into 100 kHz to 250 kHz to provide a high-frequency voltage signal, and outputs the converted voltage signal to the power transmission coil 6 as a power transmission signal Vpt. The power transmission circuit 5 includes, for example, a converter circuit that converts the power supply voltage signal Vac into a DC voltage, and an inverter circuit that converts the DC voltage into the high-frequency power transmission signal Vpt. The power transmission coil 6 outputs a magnetic field Pmg corresponding to the input power transmission signal Vpt. As the mobile printer 1 receives the magnetic field Pmg, the mobile printer 1 is supplied with drive power corresponding to the magnetic field Pmg.

That is, the mobile printer 1 according to the present embodiment can be supplied with the drive power corresponding to the first DC voltage signal Vdc1 output from the first power supply circuit 3 provided outside and the drive power corresponding to the magnetic field Pmg output from the power transmission unit 4. Thus, the mobile printer 1 is driven by the drive power corresponding to the first DC voltage signal Vdc1 or the drive power corresponding to the magnetic field Pmg. While FIG. 1 illustrates the case where drive power is supplied from both of the first DC voltage signal Vdc1 output from the first power supply circuit 3 and the magnetic field Pmg output from the power transmission unit 4, the mobile printer 1 may be supplied with drive power from only one of the first DC voltage signal Vdc1 output from the first power supply circuit 3 and the magnetic field Pmg output from the power transmission unit 4. Moreover, the mobile printer 1 may be configured to be supplied with drive power by a different method in addition to the first DC voltage signal Vdc1 output from the first power supply circuit 3 and the magnetic field Pmg output from the power transmission unit 4.

As shown in FIG. 1, the mobile printer 1 includes a power supply unit 10, a control unit 20, a print head 30, a transport unit 40, and a cutting unit 50.

The power supply unit 10 includes a first connector CN1, a second connector CN2, a power receiving module 11, a power feed switching circuit 12, a battery module 13, and a second power supply circuit 14.

The first DC voltage signal Vdc1 output from the first power supply circuit 3 is supplied to the mobile printer 1 via the first connector CN1. The first DC voltage signal Vdc1 is input to the power feed switching circuit 12. As the first connector CN1 to which the first DC voltage signal Vdc1 is supplied, a USB-Type-C receptacle connector in a shape to which a cable conforming to the USB-Type-C standard can be attached is used. That is, the power supply unit 10 has the first connector CN1 which is a USB-Type-C receptacle connector to which the first DC voltage signal Vdc1 based on the power supply voltage signal Vac is supplied.

To the first connector CN1, which is a USB-Type-C receptacle connector, a communication signal for performing communication conforming to the USB (Universal Serial Bus) standard between the mobile printer 1 and an external device may be input, in addition to the first DC voltage signal Vdc1. In this case, the mobile printer 1 may include a USB communication driver for controlling communication conforming to the USB standard.

Moreover, the first DC voltage signal Vdc1 input to the first connector CN1, which is a USB-Type-C receptacle connector, may be a voltage signal conforming to the USB-PD (USB-Power Delivery) standard that can supply drive power of approximately 15 W. In other words, the first connector CN1, which is a USB-Type-C receptacle connector, may be able to input a voltage-signal corresponding to the USB-PD standard, and may be able to input power of approximately 15 W. In this case, the mobile printer 1 may include a USB-PD driver for controlling power supply conforming to the USB-PD standard.

The power receiving module 11 receives the magnetic field Pmg output from the power transmission unit 4. Then, the power receiving module 11 generates a second DC voltage signal Vdc2 corresponding to the magnetic field Pmg, and outputs the second DC voltage signal Vdc2 to the power feed switching circuit 12. Specifically, the power receiving module 11 includes a power receiving coil 110 and a power receiving circuit 120. When supplied with the magnetic field Pmg, the power receiving coil 110 generates a high-frequency power receiving signal Vpr corresponding to the magnetic field Pmg, and outputs the high-frequency power receiving signal Vpr to the power receiving circuit 120. The power receiving circuit 120 rectifies and smoothes the supplied high-frequency power receiving signal Vpr and controls a voltage value, and thus converts the high-frequency power receiving signal Vpr into the second DC voltage signal Vdc2 having a predetermined voltage value and supplies the second DC voltage signal Vdc2 to the power feed switching circuit 12. That is, the power receiving module 11 includes the power receiving coil 110, which receives the power transmission signal Vpt based on the power supply voltage signal Vac as the power receiving signal Vpr in a contactless manner, and the power receiving circuit 120, which converts the power receiving signal Vpr received by the power receiving coil 110 into the second DC voltage signal Vdc2, and receives a signal based on the power supply voltage signal Vac from outside the mobile printer 1 by contactless power feeding. Thus, the electric power output from the power transmission unit 4 is transmitted to the mobile printer 1 in a contactless manner. The power receiving circuit 120 may execute at least one of the rectification, smoothing, and voltage value control of the power receiving signal Vpr, or may execute all of the rectification, smoothing, and voltage value control.

As described above, in the present embodiment, power feeding from the power transmission coil 6 to the power receiving coil 110 is performed without any contact point. The electric power generated by the power receiving coil 110 can be propagated to the battery module 13.

The mobile printer 1 is required to be small in size and light in weight from the viewpoint of portability. Therefore, in the mobile printer 1, from the viewpoint of implementing contactless power feeding to receive power in a contactless manner with a small size, a light weight, and a low cost, it is preferable to execute the contactless power feeding in an electromagnetic induction method, and specifically, it is preferable to use a contactless power feeding method that conforms to the wireless power feeding standard Qi and can supply power of approximately 15 W. In other words, it is preferable that the power receiving module 11 provided in the mobile printer 1 supports the wireless power feeding standard Qi and can receive power of approximately 15 W. This enables contactless power feeding to the mobile printer 1 without compromising the portability of the mobile printer 1. The contactless power feeding may also be referred to as wireless power feeding, wireless charging, a wireless transmission method, or the like.

The first DC voltage signal Vdc1 supplied via the first connector CN1 and the second DC voltage signal Vdc2 output from the power receiving circuit 120 are input to the power feed switching circuit 12. The power feed switching circuit 12 outputs one of the first DC voltage signal Vdc1 and the second DC voltage signal Vdc2 as a power feed DC voltage signal Vch to the battery module 13 via the second connector CN2. The power feed switching circuit 12 may be configured with, for example, a wired OR circuit.

That is, when only the first DC voltage signal Vdc1 is input to the power feed switching circuit 12, the power feed switching circuit 12 outputs the first DC voltage signal Vdc1 to the battery module 13 as the power feed DC voltage signal Vch, and when only the second DC voltage signal Vdc2 is input to the power feed switching circuit 12, the power feed switching circuit 12 outputs the second DC voltage signal Vdc2 to the battery module 13 as the power feed DC voltage signal Vch, and when the first DC voltage signal Vdc1 and the second DC voltage signal Vdc2 are input to the power feed switching circuit 12, the power feed switching circuit 12 selects only one of the first DC voltage signal Vdc1 and the second DC voltage signal Vdc2 or combines the first DC voltage signal Vdc1 and the second DC voltage signal Vdc2 together, and outputs the selected DC voltage signal or the two DV voltage signals combined together, to the battery module 13 as the power feed DC voltage signal Vch.

The battery module 13 holds a charge corresponding to the power feed DC voltage signal Vch based on at least one of the first DC voltage signal Vdc1 and the second DC voltage signal Vdc2, and outputs a battery DC voltage signal Vbat corresponding to the amount of charge held, from the second connector CN2 to the second power supply circuit 14.

In the mobile printer 1 according to the present embodiment, the power feed DC voltage signal Vch output from the power feed switching circuit 12 is input to the battery module 13, and the battery module 13 outputs the battery DC voltage signal Vbat based on the input power feed DC voltage signal Vch to the second power supply circuit 14, as shown in FIG. 1. That is, the voltage signal output from the power feed switching circuit 12 is input to the second power supply circuit 14 via the battery module 13. Thus, the battery module 13 functions as a stabilization circuit that reduces the risk of occurrence of fluctuations in the voltage value of the voltage signal supplied to the second power supply circuit 14, and the operation of the second power supply circuit 14 is stabilized. As such a battery module 13, for example, a lithium ion secondary battery can be used.

The second power supply circuit 14 boosts or lowers the voltage value of the supplied battery DC voltage signal Vbat to generate a drive voltage signal Vd having a predetermined voltage value, and outputs the drive voltage signal Vd to the control unit 20. Although FIG. 1 shows an illustration in which the second power supply circuit 14 generates one drive voltage signal Vd and outputs this drive voltage signal Vd to the control unit 20, the second power supply circuit 14 may generate a plurality of drive voltage signals Vd corresponding to the operating voltages of the constituent parts of the control unit 20 to which the drive voltage signals Vd are to be supplied, and may outputs the drive voltage signals Vd to the corresponding constituent parts of the control unit 20.

Note that the electrical configuration of the power supply unit 10 is not limited to the configuration shown in FIG. 1. For example, the power feed switching circuit 12, to which the first DC voltage signal Vdc1 and the second DC voltage signal Vdc2 are input, may detect the voltage value of the battery DC voltage signal Vbat output from the battery module 13 and thus estimate the amount of charge stored in the battery module 13, and may output the first DC voltage signal Vdc1 and the second DC voltage signal Vdc2 supplied thereto, to the second power supply circuit 14 without using the battery module 13 when it is determined that sufficient charge is stored in the battery module 13, and may output the first DC voltage signal Vdc1 and the second DC voltage signal Vdc2 supplied thereto, to both the battery module 13 and the second power supply circuit 14 and thus may execute the charging of the battery module 13 and the supply of the voltage signal to the second power supply circuit 14 in parallel when it is determined that sufficient charge is not stored in the battery module 13. Moreover, when neither the first DC voltage signal Vdc1 nor the second DC voltage signal Vdc2 is supplied to the power feed switching circuit 12, the power feed switching circuit 12 may output the battery DC voltage signal Vbat output from the battery module 13 to the second power supply circuit 14.

That is, the power feed switching circuit 12 may switch whether the voltage signal supplied to the second power supply circuit 14 is the first DC voltage signal Vdc1, the second DC voltage signal Vdc2, or the battery DC voltage signal Vbat, depending on the amount of charge stored in the battery module 13 and whether the first DC voltage signal Vdc1 and the second DC voltage signal Vdc2 are supplied.

The control unit 20 includes a control circuit 21, a nonvolatile memory 22, a receive buffer 23, a print head drive control unit 24, a recording paper transport control unit 25, and a recording paper cutting control unit 26.

The control circuit 21 includes a CPU (central processing unit), a ROM (read-only memory), a RAM (random-access memory), and peripheral circuits, not illustrated. To the control circuit 21, the drive voltage signal Vd output from the power supply unit 10, and print data, not illustrated, including image information to be formed on the recording medium, are input. The control circuit 21 is driven by the drive voltage signal Vd as an operation voltage, and controls each unit of the mobile printer 1 including the nonvolatile memory 22, the receive buffer 23, the print head drive control unit 24, the recording paper transport control unit 25, and the recording paper cutting control unit 26, based on the print data.

The nonvolatile memory 22 includes a semiconductor-memory device such as an EEPROM (electrically erasable programmable read-only memory) or a flash memory, and a storage medium such as a hard disk. The nonvolatile memory 22 stores various data in a rewritable manner under the control of the control circuit 21.

The receive buffer 23 includes a temporary storage area such as a RAM, and is configured with, for example, a semiconductor storage device. The receive buffer 23 stores various information such as a command related to printing of print data and the like under the control of the control circuit 21.

To the print head drive control unit 24, a first control signal Ctr1 generated by the control circuit 21 based on the print data, and the drive voltage signal Vd output from the power supply unit 10, are input. Then, the print head drive control unit 24 generates a head drive signal Sdr based on the drive voltage signal Vd at a timing prescribed by the first control signal Ctr1, and outputs the head drive signal Sdr to the print head 30. That is, the drive voltage signal Vd output from the power supply unit 10 is supplied to the print head 30 via the control unit 20. In other words, the power supply unit 10 supplies the drive voltage signal Vd to the print head 30 via the control unit 20. The print head 30 includes a plurality of resistors 32 arranged side by side along a direction orthogonal to the direction of transport of the recording medium. As the head drive signal Sdr output from the print head drive control unit 24 is supplied to each of the plurality of resistors 32, the resistor 32 generates heat.

To the recording paper transport control unit 25, a second control signal Ctr2 generated by the control circuit 21 based on the print data, and the drive voltage signal Vd output from the power supply unit 10, are input. Then, the recording paper transport control unit 25 generates a medium transport signal Str based on the drive voltage signal Vd at a timing prescribed by the second control signal Ctr2, and outputs the medium transport signal Str to the transport unit 40. That is, the drive voltage signal Vd output from the power supply unit 10 is supplied to the transport unit 40 via the control unit 20. In other words, the power supply unit 10 supplies the drive voltage signal Vd to the transport unit 40 via the control unit 20. The transport unit 40 includes a transport motor 42 to transport the recording medium in the direction of transport. As the medium transport signal Str output from the recording paper transport control unit 25 is supplied to the transport motor 42, the transport motor 42 is driven and the recording medium is transported along a predetermined direction of transport with the driving of the transport motor 42.

To the recording paper cutting control unit 26, a third control signal Ctr3 generated by the control circuit 21 based on the print data, and the drive voltage signal Vd output from the power supply unit 10, are input. The recording paper cutting control unit 26 generates a medium cutting signal Sct based on the drive voltage signal Vd at a timing prescribed by the third control signal Ctr3, and outputs the medium cutting signal Sct to the cutting unit 50. That is, the drive voltage signal Vd output from the power supply unit 10 is supplied to the cutting unit 50 via the control unit 20. In other words, the power supply unit 10 supplies the drive voltage signal Vd to the cutting unit 50 via the control unit 20. The cutting unit 50 includes a cutting motor 52 to cut the recording medium at a predetermined timing. As the medium cutting signal Sct output from the recording paper cutting control unit 26 is supplied to the cutting motor 52, the cutting motor 52 is driven and a movable blade 56, described later, is driven to slide toward a fixed blade 54, described later, with the driving of the cutting motor 52. Thus, the recording medium is pressed against the fixed blade 54, and the recording medium is cut to a predetermined size.

In the present embodiment, a mechanical portion including the print head 30, the transport unit 40, and the cutting unit 50 is shown as a mechanical unit UN1 in FIG. 1.

Also, the mechanical unit UN1 may include, for example, one or more of a gear train coupled to the transport motor 42, and the print head 30 or the like.

Note that the configuration of the mechanical unit UN1 is not necessarily limited to this example, and may be another configuration including, for example, the transport motor 42.

Also, the configuration of the control unit 20 is not necessarily limited to this example. The control unit 20 may include, for example, a wiring board to control the transport motor 42 and the print head 30, and may also include a terminal such as a USB terminal that can be coupled to an external device.

The wiring board may also be referred to as, for example, a control board.

In the mobile printer 1 configured as described above, the control circuit 21 starts operation, based on the drive voltage signal Vd output from the power supply unit 10. Then, the control circuit 21 generates the first control signal Ctr1, the second control signal Ctr2, and the third control signal Ctr3 based on the input print data, and outputs the first control signal Ctr1, the second control signal Ctr2, and the third control signal Ctr3 to the print head drive control unit 24, the recording paper transport control unit 25, and the recording paper cutting control unit 26.

Thus, the recording medium is transported along the direction of transport, and the resistor 32 generates heat in synchronization with the transport of the recording medium. As a result, heat is applied to a desired position on the recording medium and a desired character, image, or the like is formed on the recording medium. Then, the recording medium with the character, image, or the like formed thereon is cut to a predetermined size. Thus, the recording medium in the predetermined size with the desired character, image, or the like formed thereon is discharged from the mobile printer 1.

As described above, the mobile printer 1 according to the present embodiment includes the print head 30 performing printing on the recording medium, the transport unit 40 transporting the recording medium to the print head 30, the cutting unit 50 cutting the recording medium, the control unit 20 controlling the operations of the print head 30, the transport unit 40, and the cutting unit 50, and the power supply unit 10 supplying the drive voltage signal Vd to the print head 30, the transport unit 40, and the cutting unit 50. Then, under the control of the control unit 20, the transport unit 40 transports the recording medium to the print head 30, and the print head 30 supplies heat to the transported recording medium. Thus, a desired image is formed on the recording medium, which is a heat-sensitive paper. Subsequently, the recording medium with the image formed thereon is cut to a desired size by the cutting unit 50. As a result, the recording medium in the desired size with the image formed thereon is discharged from the mobile printer 1.

The structure of the mobile printer 1 will be described.

The structure of the mobile printer 1 will now be described.

Figure 2:
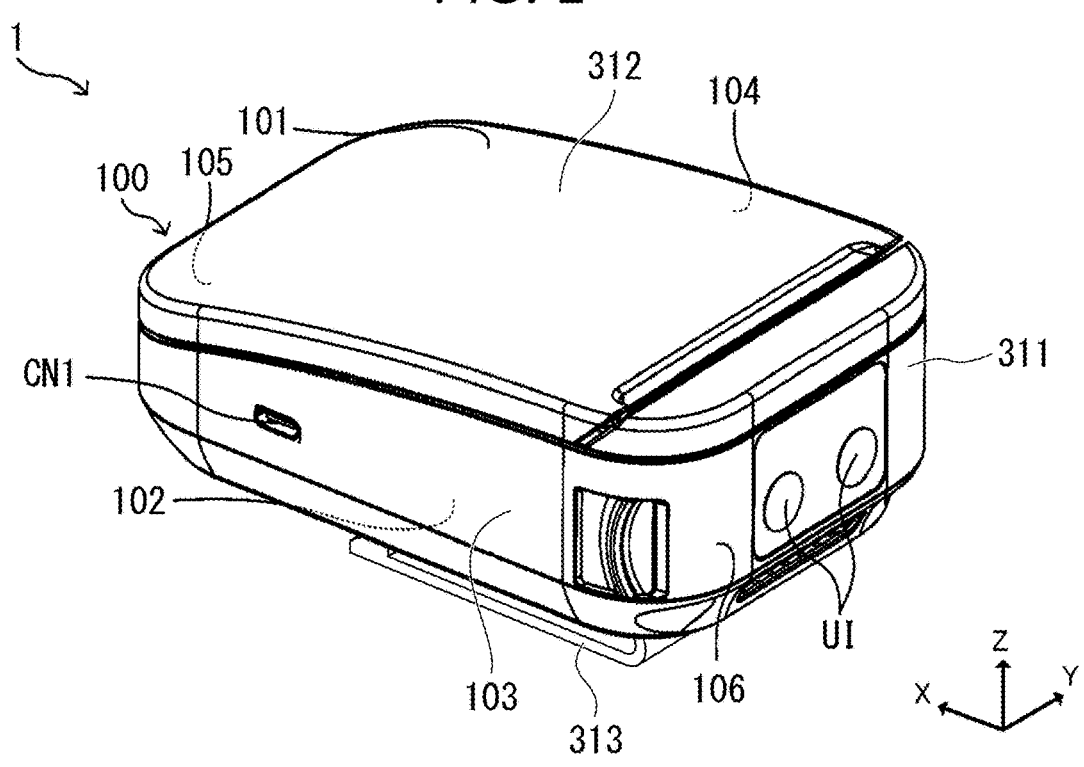
FIG. 2 is a perspective view of the mobile printer with a cover closed.

FIG. 2 is a perspective view of the mobile printer 1 with a cover 312 closed.

Figure 3:
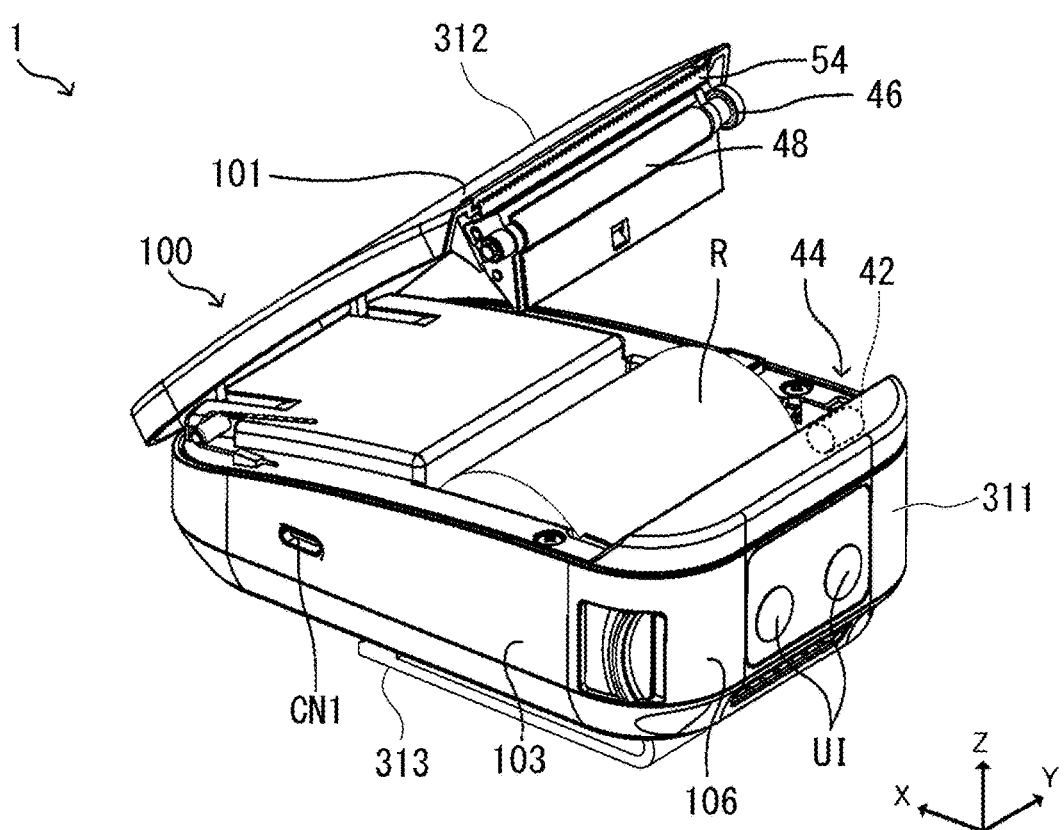
FIG. 3 is a perspective view of the mobile printer with the cover opened.

FIG. 3 is a perspective view of the mobile printer 1 with the cover 312 opened.

In the description below, an X direction, a Y direction, and a Z direction orthogonal to each other are used. Also, in the description below, in some cases, the starting point side of an arrow indicating the X direction shown in the drawing is referred to as −X side, the distal end side thereof is referred to as +X side, the starting point side of an arrow indicating the Y direction shown in the drawing is referred to as −Y side, the distal end side thereof is referred to as +Y side, the starting point side of an arrow indicating the Z direction shown in the drawing is referred to as −Z side, and the distal end side thereof is referred to as +Z side.

As illustrated in FIGS. 2 and 3, the mobile printer 1 includes a casing 100. The casing 100 includes a first surface 101 and a second surface 102 situated facing each other in a direction along the Z direction, a third surface 103 and a fourth surface 104 situated facing each other in a direction along the Y direction, and a fifth surface 105 and a sixth surface 106 situated facing each other in a direction along the X direction. Specifically, in the casing 100, the first surface 101 and the second surface 102 are situated facing each other in such a way that the first surface 101 is on the −Z side and the second surface 102 is on the +Z side in the direction along the Z direction, the third surface 103 and the fourth surface 104 are situated facing each other in such a way that the third surface 103 is on the −Y side and the fourth surface 104 is on the +Y side in the direction along the Y direction, and the fifth surface 105 and the sixth surface 106 are situated facing each other in such a way that the fifth surface 105 is on the +X side and the sixth surface 106 is on the −X side in the direction along the X direction. Thus, the first surface 101, the second surface 102, the third surface 103, the fourth surface 104, the fifth surface 105, and the sixth surface 106 constitute a housing space to house various constituent parts inside the casing 100. The first surface 101 is provided in such a way as to be rotationally movable about an end part on the +X side as an axis of rotation. Thus, a part of the housing space configured with the first surface 101, the second surface 102, the third surface 103, the fourth surface 104, the fifth surface 105, and the sixth surface 106 can be opened and closed. In the description below, the housing space configured with the first surface 101, the second surface 102, the third surface 103, the fourth surface 104, the fifth surface 105, and the sixth surface 106 may be referred to as a housing space of the casing 100.

As illustrated in FIG. 3, a roll paper R is housed in the housing space of the casing 100. The roll paper R is a so-called roll paper formed of the above-described recording medium that is wound, and in the present embodiment, is a heat-sensitive roll paper formed of a heat-sensitive paper that is wound as the recording medium. In the description below, the recording medium constituting the roll paper R may be referred to as a recording paper P.

The roll paper R may be referred to as, for example, a roll body.

Also, as shown in FIG. 3, a platen roller 48 and a gear 46 are provided at an end part on the −X side of the first surface 101. The platen roller 48 includes a rotation shaft along the Y direction and is provided in such a way as to be rotatable. The gear 46 is fixed to an end part on the +Y side of the platen roller 48. The platen roller 48 and the gear 46 configured as described above are housed in the housing space when the first surface 101 closes the housing space of the casing 100. At this time, the gear 46 is inserted through an opening 44 of the casing 100 and comes into contact with the transport motor 42 housed in the housing space of the casing 100. Thus, when the transport motor 42 is driven by the medium transport signal Str output from the control unit 20, the driving force propagates to the platen roller 48 via the gear 46, and the platen roller 48 is driven.

As shown in FIGS. 2 and 3, an operation unit UI is situated at the sixth surface 106 of the casing 100. The operation unit UI functions as a user interface to accept operation information from a user. When the user operates the operation unit UI, the mobile printer 1 executes a predetermined operation including print processing.

The user may be referred to as a user or the like.

Also, at the third surface 103 of the casing 100, the first connector CN1 provided in such a way that at least a part thereof is exposed outside of the casing 100 is situated. As described above, the first connector CN1 is a USB-Type-C receptacle connector, via which the first DC voltage signal Vdc1 as driving power is supplied to the mobile printer 1. When the first connector CN1 can perform communication conforming to the USB-Type-C USB communication standard, the mobile printer 1 is communicably coupled to an external device such as a host computer via the first connector CN1. Thus, the user can cause the mobile printer 1 to execute a predetermined operation including print processing by an operation of the external device communicably coupled via the first connector CN1 in addition to the operation of the operation unit UI described above.

In the present embodiment, the casing 100 includes a case 311 and the cover 312.

Also, the mobile printer 1 includes a belt clip 313 that is attachable to and removable from the second surface 102 of the case 311.

The belt clip 313 has an attachment part that can be removably attached to a predetermined position on the user or the user's clothing or the like. The predetermined position may be, for example, a belt or clothes such as pants other than the belt.

The configuration to removably fix the second surface 102 of the case 311 and the belt clip 313 is not particularly limited, and for example, a configuration using a magnetic connector using magnetism, or a configuration using snap-fit or the like using fitting via the elasticity of resin, may be used as a configuration that enables easy attachment and removal without using a tool. As the magnetic connector, for example, a combination of magnets provided at both the case 311 and the belt clip 313 may be used, or a combination of a magnet provided at one of the case 311 and the belt clip 313 and a metal provided at the other may be used.

Also, the case 311 and the belt clip 313 may be coupled together in a fixed manner so as not to be attachable or removable, for example, by screw-fastening that needs a tool.

The position where the belt clip 313 is arranged in relation to the case 311 is not particularly limited, and various positions may be used.

In the present embodiment, the operation unit UI is arranged on one side of the case 311 in the X direction, and the belt clip 313 is arranged on the same side as the operation unit UI. The operation unit UI may be, for example, an operation panel operated by the user.

As another example, when the operation unit UI is arranged at the fourth surface 104 of the cover 312, the belt clip 313 may be arranged at the other side in the X direction.

Here, the mobile printer 1 according to the present embodiment is a printing device driven by a battery such as a battery pack, and is assumed to be used in various situations.

For example, it is assumed that the user temporarily takes the mobile printer 1 out of a store or the like, or that the mobile printer 1 is used outdoors most of the time, or the like. In this case, it is desirable that the mobile printer 1 is used hands-free by the user, and a situation where the mobile printer 1 is attached to a belt or the like on the waist of the user is assumed.

An example of the internal structure of the mobile printer 1 will now be described.

Figure 4A:
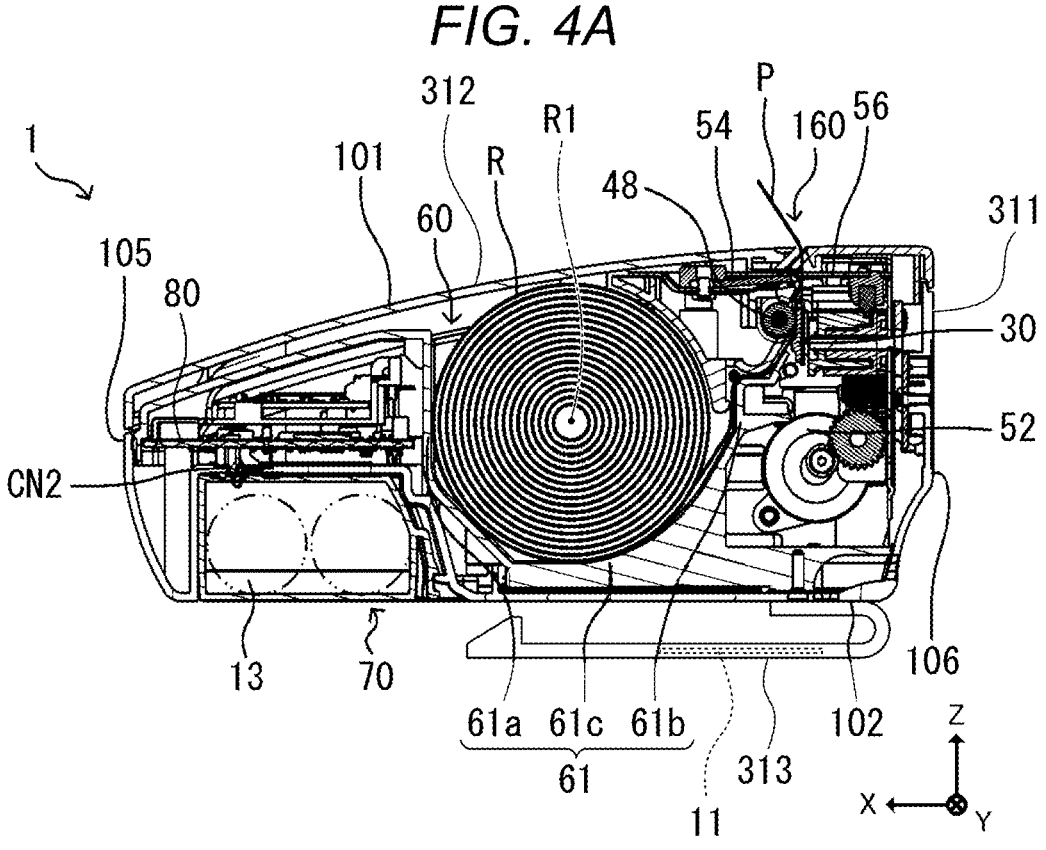
FIG. 4A is a cross-sectional view showing an example of the internal structure of the mobile printer.

FIG. 4A is a cross-sectional view illustrating an example of the internal structure of the mobile printer 1. FIG. 4A shows XYZ similar to those in FIG. 2 and FIG. 3.

As shown in FIG. 4A, the housing space of the casing 100 houses a first wiring board 80, the platen roller 48, the print head 30, the cutting motor 52, the fixed blade 54, the movable blade 56, the power receiving module 11, and a roll paper housing unit 60.

The roll paper housing unit 60 may be referred to as, for example, a roll body housing unit or the like.

The wiring coupled to the power receiving coil 110 of the power receiving module 11 is not shown in FIG. 4A and will be described with reference to FIG. 4B.

The first wiring board 80 is situated in a region on the +X side of the housing space of the casing 100 and in the vicinity of the fifth surface 105 of the casing 100. The first wiring board 80 is provided with various circuits and electronic components including the power feed switching circuit 12 and the second power supply circuit 14 included in the power supply unit 10, and the control circuit 21, the nonvolatile memory 22, the receive buffer 23, the print head drive control unit 24, the recording paper transport control unit 25, and the recording paper cutting control unit 26 provided in the control unit 20, which are described above. That is, the control unit 20 is provided at the first wiring board 80. In the present embodiment, the first wiring board 80 is described as being configured with one substrate, but the first wiring board 80 may include a plurality of substrates.

The platen roller 48, the print head 30, the cutting motor 52, the fixed blade 54, and the movable blade 56 are situated in a region on the –X side of the housing space of the casing 100 and in the vicinity of the sixth surface 106 of the casing 100.

Specifically, the platen roller 48 is situated at an end part on the –X side of the first surface 101 and is provided in such a way that the axis of rotation is substantially parallel to the Y direction. The print head 30 is situated to face the platen roller 48 on the –X side of the platen roller 48. Then, the recording paper P wound in the form of the roll paper R is held between the platen roller 48 and the print head 30 situated to face each other.

As described above, the platen roller 48 is driven with the driving of the transport motor 42. Therefore, the recording paper P held between the platen roller 48 and the print head 30 is transported in such a way as to be drawn out of the roll paper R as the platen roller 48 is driven. Then, the recording paper P drawn out of the roll paper R is discharged outside of the mobile printer 1 through a discharge port 160 situated on the +Z side of the casing 100. That is, the transport motor 42, the gear 46, and the platen roller 48 draw out the recording paper P from the roll paper R and transport the recording paper P toward the discharge port 160 via the print head 30. The configuration including the transport motor 42, the gear 46, and the platen roller 48 is equivalent to the foregoing transport unit 40. In other words, the transport unit 40 draws out the recording paper P from the roll paper R and transports the recording paper P to the print head 30.

The fixed blade 54 and the movable blade 56 are arranged upstream of the platen roller 48 and the print head 30 and downstream of the discharge port 160 along the direction of transport of the recording paper P. At this time, a transport path along which the recording paper P is transported is situated between the fixed blade 54 and the movable blade 56. Specifically, the fixed blade 54 and the movable blade 56 are situated on the +Z side of the platen roller 48 and the print head 30 and on the –Z side of the discharge port 160. At this time, the fixed blade 54 is situated on the +X side of the transport path of the recording paper P, and the movable blade 56 is situated on the –X side of the transport path of the recording paper P.

In the present embodiment, the transport path of the recording paper P extends from a point where the recording paper P passes through the print head 30 to a point where the recording paper P exits the discharge port 160.

The cutting motor 52 is situated in the vicinity of the movable blade 56. The cutting motor 52 is driven when supplied with the medium cutting signal Sct output from the recording paper cutting control unit 26. With the driving of the cutting motor 52, the movable blade 56 slides toward the fixed blade 54 in such a way as to appropriately rub against the fixed blade 54. Thus, the recording paper P transported along the transport path situated between the fixed blade 54 and the movable blade 56 is pressed against the fixed blade 54. As a result, the recording paper P is cut. Subsequently, the cut recording paper P is discharged outside of the mobile printer 1 via the discharge port 160. That is, the cutting motor 52, the fixed blade 54, and the movable blade 56 cut the recording paper P transported by the transport unit 40. The configuration including the cutting motor 52, the fixed blade 54, and the movable blade 56 is equivalent to the foregoing cutting unit 50. The cutting unit 50 cuts the recording paper P by the movable blade 56 pressing the recording paper P against the fixed blade 54.

When the cutting unit 50 cuts the recording paper P, the recording paper P may have to be pressed against only one of the fixed blade 54 and the movable blade 56. Therefore, the cutting unit 50 may be configured to press the recording paper P against one of the fixed blade 54 and the movable blade 56 in response to a force applied by the user or the like. That is, the cutting unit 50 may cut the recording paper P by pressing the recording paper P against the fixed blade 54 or the movable blade 56. When the cutting unit 50 has this configuration, the cutting unit 50 may include only one of the fixed blade 54 and the movable blade 56.

The fixed blade 54 and the movable blade 56 repeatedly cut the recording paper P. Therefore, the fixed blade 54 and the movable blade 56 are required to maintain high cutting performance even when repeatedly pressed against the recording paper P. The fixed blade 54 and the movable blade 56 are preferably made of a metal that has a strength and a property suitable for the blade and that enables easy processing of a cutting edge suitable for the blade, and are preferably made of, for example, iron, steel, stainless steel, or the like. Also, the fixed blade 54 and the movable blade 56 may have a shape to be able to cut the recording paper P when the recording paper P is pressed against these blades, and the cutting edges of the fixed blade 54 and the movable blade 56 may be linear or serrated. When the cutting edges of the fixed blade 54 and the movable blade 56 are linear, the risk of paper dust being generated on the cut surface of the recording paper P is reduced. Meanwhile, when the cutting edge of the fixed blade 54 or the movable blade 56 is serrated, the fixed blade 54 or the movable blade 56 can cut the recording paper P with a small force and therefore the convenience for the user is improved.

Also, for example, the mobile printer 1 may include a manual cutter near the discharge port 160.

The roll paper R formed of the wound recording paper P is housed in the roll paper housing unit 60 in a drop-in manner. Such a roll paper housing unit 60 includes a partition wall part 61 and is situated between the first wiring board 80, and the platen roller 48, the print head 30, the cutting motor 52, the fixed blade 54, and the movable blade 56 in a direction along the X direction. Specifically, the roll paper housing unit 60 is configured with an a-th partition wall part 61a, a b-th partition wall part 61b, and a c-th partition wall part 61c, which are parts of the partition wall part 61. The roll paper housing unit 60 is provided in the housing space of the casing 100 in such a way that, in the state where the roll paper R is housed therein, the a-th partition wall part 61a, which is a part of the partition wall part 61, is situated between the housed roll paper R and the first wiring board 80, and the b-th partition wall part 61b, which is a part of the partition wall part 61, is situated between the housed roll paper R and the cutting motor 52, and the c-th partition wall part 61c, which is a part of the partition wall part 61, is situated between the housed roll paper R and the second surface 102.

The c-th partition wall part 61c situated between the housed roll paper R and the cutting motor 52, of the partition wall part 61 provided in the roll paper housing unit 60, constitutes a part of the transport path along which the recording paper P is transported. This enables the miniaturization of the mobile printer 1.

FIG. 4A shows the axis R1 along the Y direction, which is the axis of rotation of the roll paper R. The roll paper R rotates about the axis R1 and the recording paper P is thus drawn out of the roll paper R.

The power receiving module 11 is provided at the belt clip 313.

The power receiving coil 110 receives the magnetic field Pmg based on the high-frequency power transmission signal Vpt output from the power transmission unit 4. That is, the magnetic field Pmg is formed around the power receiving coil 110.

As illustrated in FIG. 4A, the casing 100 includes a battery housing unit 70 where the battery module 13 is housed. The battery housing unit 70 is a recessed space situated on the +X side of the power receiving module 11 and on the −Z side of the first wiring board 80, and formed at a part of the second surface 102 and opening to the −Z side. That is, the battery housing unit 70 is provided outside the casing 100. Therefore, the second surface 102 constituting the battery housing unit 70 is interposed between the battery module 13 housed in the battery housing unit 70, and the first wiring board 80 and the roll paper housing unit 60 housed in the housing space of the casing 100. In other words, the second surface 102 is situated between the battery module 13 and the first wiring board 80, and the second surface 102 is situated between the battery module 13 and the roll paper housing unit 60.

A part of the second connector CN2 provided at the first wiring board 80 is exposed on the side surface on the +Z side of the battery housing unit 70. When the battery module 13 is housed in the battery housing unit 70, an electrode, not illustrated, of the battery module 13 and the second connector CN2 are electrically coupled to each other. Thus, the first wiring board 80 and the battery module 13 are electrically coupled to each other via the second connector CN2.

As described above, in the mobile printer 1, the roll paper housing unit 60, the print head 30, the transport unit 40, at least a part of the power supply unit 10 including the power receiving module 11, and the control unit 20 provided at the first wiring board 80 are housed in the housing space formed inside the casing 100, and the battery module 13 is housed in the battery housing unit 70 provided outside the casing 100. In other words, the casing 100 includes the first surface 101, the second surface 102, the third surface 103, the fourth surface 104, the fifth surface 105, and the sixth surface 106, and is provided in such a way as to cover the roll paper housing unit 60, the print head 30, the transport unit 40, the cutting unit 50, at least a part of the power supply unit 10, and the control unit 20. Thus, the casing 100 reduces the risk of an external impact being applied to the roll paper housing unit 60, the print head 30, the transport unit 40, the cutting unit 50, and the power supply unit 10 of the mobile printer 1.

In the mobile printer 1, of the roll paper housing unit 60, the print head 30, the transport unit 40, the cutting unit 50, and the control unit 20 housed in the housing space of the casing 100, the control unit 20 is situated in the vicinity of the fifth surface 105, and the print head 30, the transport unit 40, and the cutting unit 50 are situated in the vicinity of the sixth surface 106, and the roll paper housing unit 60 is situated between the control unit 20, and the print head 30, the transport unit 40, and the cutting unit 50 in a direction along the direction from the fifth surface 105 to the sixth surface 106. That is, the roll paper housing unit 60, the transport unit 40, and the control unit 20 are situated in the order of the control unit 20, the roll paper housing unit 60, and the transport unit 40 in the direction along the direction from the fifth surface 105 to the sixth surface 106, and the roll paper housing unit 60, the cutting unit 50, and the control unit 20 are situated in the order of the control unit 20, the roll paper housing unit 60, and the cutting unit 50 in the direction along the direction from the fifth surface 105 to the sixth surface 106, and the roll paper housing unit 60, the print head 30, and the control unit 20 are situated in the order of the control unit 20, the roll paper housing unit 60, and the print head 30 in the direction along the direction from the fifth surface 105 to the sixth surface 106. In other words, the shortest distance between the control unit 20 and the fifth surface 105 is shorter than the shortest distance between the control unit 20 and the sixth surface 106, and the shortest distance between the transport unit 40 and the fifth surface 105 is longer than the shortest distance between the transport unit 40 and the sixth surface 106, and the shortest distance between the cutting unit 50 and the fifth surface 105 is longer than the shortest distance between the cutting unit 50 and the sixth surface 106, and the shortest distance between the print head 30 and the fifth surface 105 is longer than the shortest distance between the print head 30 and the sixth surface 106.

Thus, all of the head drive signal Sdr, the medium transport signal Str, and the medium cutting signal Sct output from the control unit 20 propagate from the fifth surface 105 side toward the sixth surface 106 side in the housing space of the casing 100. Thus, the risk of noise being superimposed on the head drive signal Sdr, the medium transport signal Str, and the medium cutting signal Sct is reduced, and the risk of the mobile printer 1 malfunctioning due to the mutual offset of the head drive signal Sdr, the medium transport signal Str, and the medium cutting signal Sct is reduced.

Figures 4B, 4C:
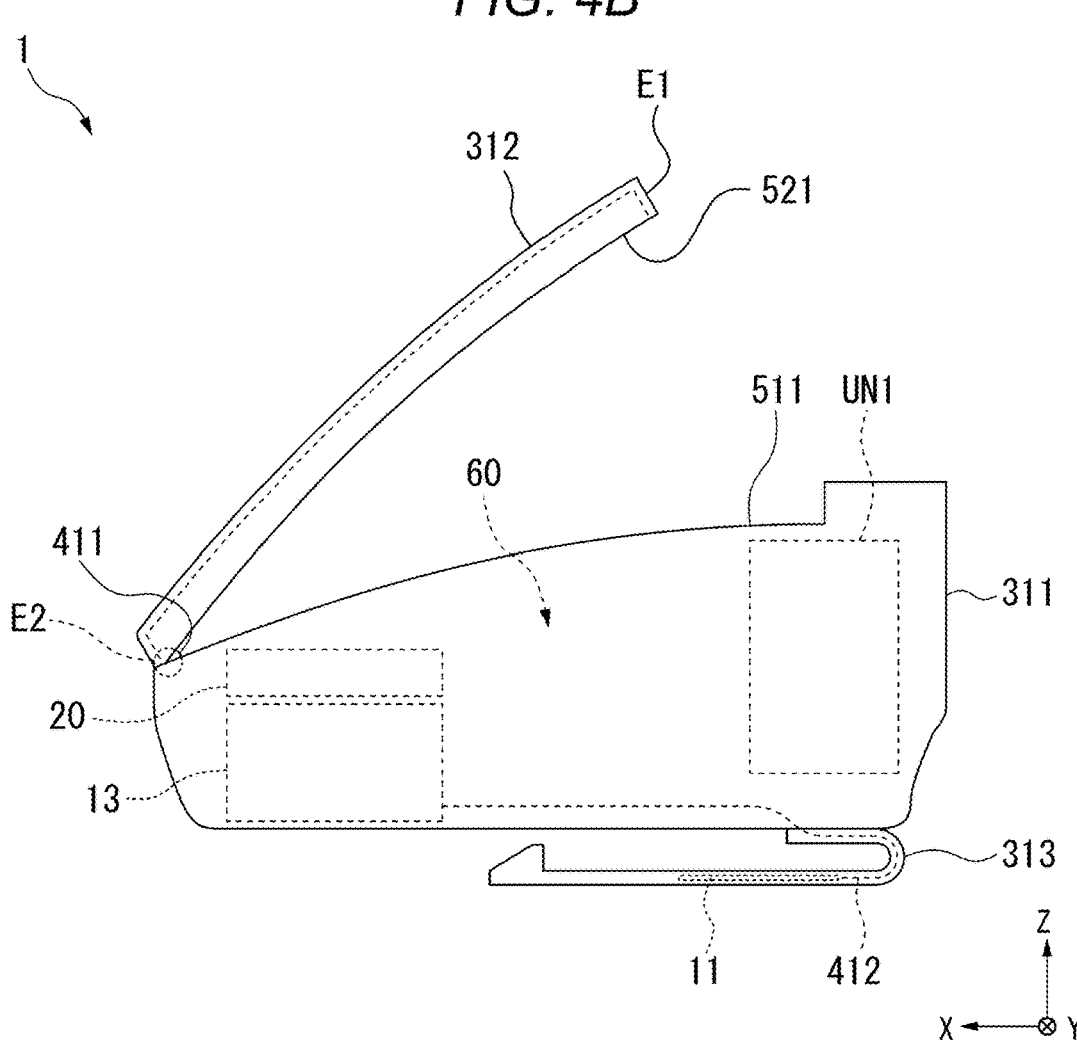
FIG. 4B shows an example of the schematic structure of the mobile printer in a state where the cover is opened in relation to a case.
FIG. 4C shows an example of the state of the back side of the mobile printer.

FIG. 4B shows an example of the schematic structure of the mobile printer 1 in the state where the cover 312 is opened in relation to the case 311. FIG. 4B shows XYZ similar to those in FIGS. 2 and 3.

FIG. 4B shows a schematic arrangement relationship of a part of the elements of the mobile printer 1. The arrangement positions of the elements illustrated in FIG. 4B are schematic positions for illustration and are not necessarily precise positions.

In the example shown in FIG. 4A, the illustration of a part of the components shown in FIG. 4B is omitted in order to avoid the complication of the illustration, but the components shown in FIG. 4B are also provided in FIG. 4A.

The case 311 is provided with the control unit 20, the mechanical unit UN1, and the roll paper R, and the battery module 13 is attached thereto.

The surface on the −Z side of the case 311 is the second surface 102, and the surface on the +Z side of the case 311 is a seventh surface 511.

The surface on the +Z side of the cover 312 is the first surface 101, and the surface on the −Z side of the cover 312 is an eighth surface 521.

The seventh surface 511 of the case 311 and the eighth surface 521 of the cover 312 face each other in the state where the cover 312 is closed in relation to the case 311.

The seventh surface 511 on the +Z side of the case 311 is, for example, a virtual plane, and in practice, has a recessed-protruding structure as internal structural components of the case 311 are present, when the case 311 is viewed in a direction from the +Z side toward the −Z side.

The cover 312 has a first end part E1, which is an end part on the −X side, and a second end part E2, which is an end part on the +X side.

In the present embodiment, a first rotary movable part 411 that rotatably supports the cover 312 in relation to the case 311 is provided at the second end part E2 of the cover 312. The first rotary movable part 411 is provided, for example, inside the case 311.

Here, the first rotary movable part 411 may be, for example, a hinge or the like.

In the present embodiment, the power receiving module 11 is arranged inside the belt clip 313. In the present embodiment, the constituent parts of the belt clip 313 overlap the power receiving module 11 when viewed along the Z direction, but the power receiving module 11 is arranged inside the outermost constituent part that is farthest from the case 311.

The mobile printer 1 includes a first wiring 412 that electrically couples the power receiving module 11 and the battery module 13.

In the present embodiment, the first wiring 412 extends along the inside of the belt clip 313 so as to enter the inside of the case 311 and be drawn to the battery module 13 inside the case 311.

In the present embodiment, as shown in FIG. 4B, in the state where the cover 312 is in the open position, the roll paper R can be taken out of the roll paper housing unit 60 and the roll paper R can be attached to the roll paper housing unit 60. Also, as shown in FIG. 4A, in the state where the cover 312 is in the closed position, the discharge port 160 is formed.

FIG. 4C shows an example of the state of the back side of the mobile printer 1. FIG. 4C shows XYZ similar to those in FIGS. 2 and 3.

In the present embodiment, the second surface 102 of the case 311 on the side where the belt clip 313 is provided is referred to as the back side for the sake of convenience of description, but this is not necessarily limiting.

FIG. 4C shows the second surface 102 of the case 311 of the mobile printer 1, the belt clip 313, and the battery module 13 housed in the battery housing unit 70.

FIG. 4C also shows a first coupling position 313a representing a position where the second surface 102 of the case 311 of the mobile printer 1 and the belt clip 313 are coupled together.

In the present embodiment, the configuration in which the battery module 13 is installed at the second surface 102 on the −Z side of the mobile printer 1 is described, but as another example, a configuration in which the battery module 13 is installed at the third surface 103 on the −Y side or the fourth surface 104 on the +Y side of the mobile printer 1 may be used.

In the present embodiment, the battery module 13 is attachable to and removable from the battery housing unit 70 of the case 311 of the mobile printer 1. In the present embodiment, the battery module 13 is configured to be attachable to and removable from the battery housing unit 70 in a predetermined insertion-extraction direction.

When the battery module 13 is attached to the battery housing unit 70, the circuit terminal of the battery module 13 and the circuit terminal inside the mobile printer 1 are electrically coupled to each other.

Figures 4D, 5:
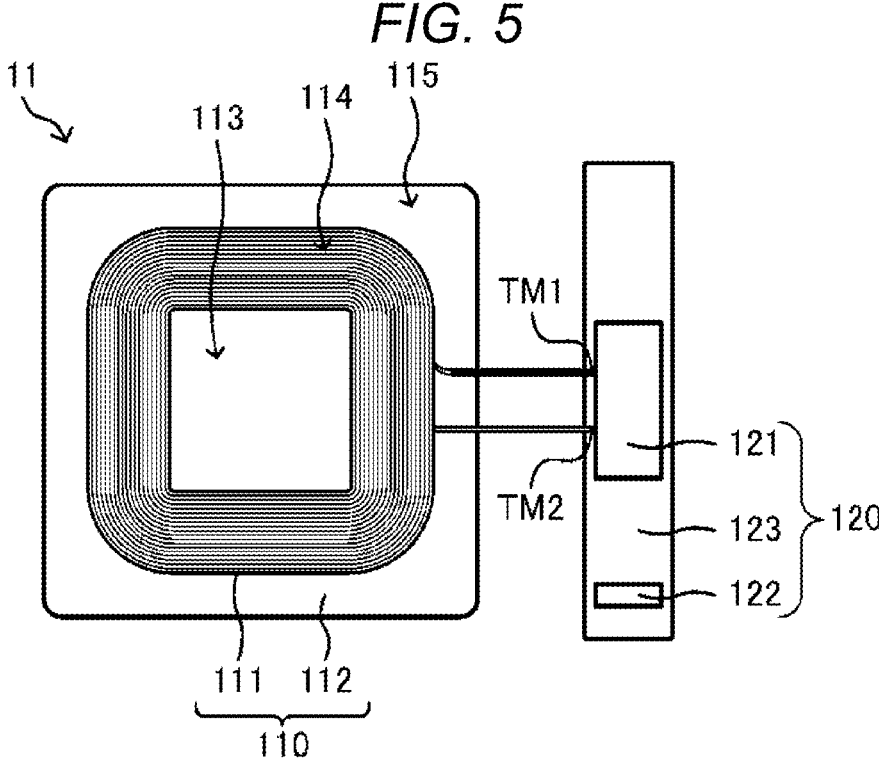
FIG. 4D shows an example of the arrangement position of a power receiving module when a protection cover is used.
FIG. 5 shows an example of the structure of the power receiving module.

FIG. 4D shows an example of an arrangement position of the power receiving module 11 when a protection cover 321 is used. FIG. 4D shows XYZ similar to those in FIGS. 2 and 3.

The example shown in FIG. 4D is a modification example, and the power receiving module 11 is provided outside the belt clip 313 instead of inside the belt clip 313.

FIG. 4D shows an example of the state when the belt clip 313 is viewed from a viewpoint of viewing from the −Z side to the +Z side.

The power receiving module 11 is provided at the surface on the −Z side of the belt clip 313.

The power receiving module 11 may be attached to the surface on the −Z side of the belt clip 313, for example, with an adhesive or the like. In this case, as an example, the power receiving coil 110 forming the power receiving module 11 may be attached to the surface on the −Z side of the belt clip 313.

In the example shown in FIG. 4D, a case where the protection cover 321 covering the power receiving module 11 is provided is shown. In this example, the protection cover 321 is formed of a transparent member and is not in contact with the power receiving module 11. In the present embodiment, the protection cover 321 is used to protect the wiring.

In the example shown in FIG. 4D, a 1*a*-th wiring 412a, which is a part exposed outside, of the first wiring 412 coupled to the power receiving module 11, is illustrated. In this example, the 1*a*-th wiring 412a, too, is covered by the protection cover 321 and is not in contact with the protection cover 321.

Various examples may be used as the shape, material, or the like of the protection cover 321.

The protection cover 321 may not necessarily be provided.

A specific example of the structure of the power receiving module 11 will be described.

A specific example of the structure of the power receiving module 11 will now be described with reference to FIG. 5.

FIG. 5 shows an example of the structure of the power receiving module 11. As illustrated in FIG. 5, the power receiving module 11 includes the power receiving coil 110 and the power receiving circuit 120.

The power receiving coil 110 receives, in a contactless manner, the magnetic field Pmg corresponding to the power transmission signal Vpt based on the power supply voltage signal Vac from the power transmission unit 4 provided outside the mobile printer 1, as the power receiving signal Vpr. The power receiving coil 110 has an annular coil 111 through which a power receiving signal Vpr corresponding to the magnetic field Pmg propagates, and a mold member 112 provided to cover the annular coil 111.

The annular coil 111 includes a conductor such as copper formed in an annular shape, and a third end part TM1, which is an end part of one end of the conductor, and a fourth end part TM2, which is an end part of the other end, are electrically coupled to the power receiving circuit 120. A current corresponding to the magnetic field Pmg generated around the annular coil 111 flows through the annular coil 111. That is, a potential difference corresponding to the current is generated between the third end part TM1 and the fourth end part TM2 of the annular coil 111. The power receiving coil 110 outputs the potential difference generated between the third end part TM1 and the fourth end part TM2 of the annular coil 111 to the power receiving circuit 120 as the power receiving signal Vpr.

Also, the mold member 112 provided to cover the annular coil 111 functions as an insulator that retains the shape of the annular coil 111 and that reduces the risk of a short-circuit abnormality occurring between each constituent part of the mobile printer 1 and the annular coil 111 due to an impact or the like caused by the annular coil 111 coming into contact with each part of the mobile printer 1. Thus, the risk of change in the characteristics of the annular coil 111 is reduced and the power receiving sensitivity of the magnetic field Pmg by the power receiving coil 110 is improved.

The power receiving coil 110 includes a coil region 114 where the annular coil 111 through which the power receiving signal Vpr propagates is situated, a coil internal region 113 situated inside the coil region 114, and a coil external region 115 situated outside the coil region 114.

The power receiving circuit 120 converts the power receiving signal Vpr output from the power receiving coil 110 into the second DC voltage signal Vdc2 and outputs the second DC voltage signal Vdc2. Specifically, the power receiving circuit 120 includes a voltage conversion circuit 121, a connector 122, and a second wiring board 123 where the voltage conversion circuit 121 and the connector 122 are provided.

The voltage conversion circuit 121 includes a rectifier circuit for rectifying the high-frequency power receiving signal Vpr, a smoothing circuit for smoothing the rectified voltage output from the rectifier circuit, a transforming circuit for transforming the voltage value of the smoothed voltage output from the smoothing circuit into a predetermined voltage value and thus outputting the transformed voltage value as the second DC voltage signal Vdc2, and the like. The second DC voltage signal Vdc2 output from the voltage conversion circuit 121 propagates through the second wiring board 123 and is output from the power receiving module 11 via the connector 122.

As described above, in the power receiving module 11, the power receiving coil 110 receives the voltage signal based on the magnetic field Pmg and outputs the power receiving signal Vpr corresponding to the magnetic field Pmg to the power receiving circuit 120, and the power receiving circuit 120 generates the second DC voltage signal Vdc2 having a predetermined voltage value from the power receiving signal Vpr output from the power receiving coil 110 and outputs the second DC voltage signal Vdc2 from the connector 122.

The power receiving module 11 configured as described above receives, in a contactless manner, the magnetic field Pmg output from the power transmission unit 4 provided outside the mobile printer 1.

An example of the position alignment between the power receiving coil 110 and the power transmission coil 6 will be described.

Figures 6A, 6B:
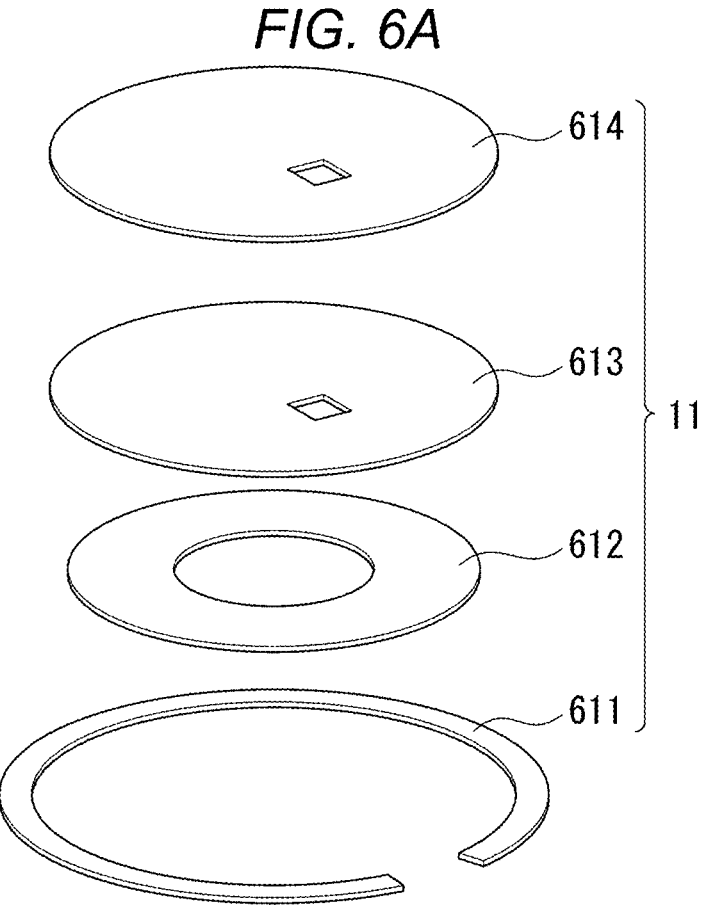
FIG. 6A is an exploded view showing an example of a power receiving coil.
FIG. 6B shows an example of position alignment between the power receiving coil and a power transmission coil.

FIG. 6A and FIG. 6B show an example of the position alignment between the power receiving coil 110 and the power transmission coil 6. In this example, a case where the shape of the coil is a disk shape is described as an example to simplify the illustration, but the shape of the coil may be any shape.

FIG. 6A is an exploded view showing an example of the power receiving coil 110.

In this example, the power receiving coil 110 is configured with a first magnetic array 611, a first coil 612, a magnetic shield 613, and a metal shield 614 superimposed on each other.

The first coil 612 is a planar coil formed of conductors wound concentrically.

The magnetic shield 613 is made of, for example, a material such as iron, and is a flat plate.

The metal shield 614 is made of, for example, copper, and is a flat plate.

The magnetic shield 613 and the metal shield 614 have the same or similar planar shape, and the first coil 612 has a planar shape included in the region of the planar shape of the magnetic shield 613 and the metal shield 614.

The first magnetic array 611 has a circumferential planar shape along a circumference outside of the region of the planar shape of the first coil 612, and in this example, is cut off at one point on the circumference and has two end parts at this point.

Such a cut-off region of the first magnetic array 611 may be used, for example, to pass the conductor of the coil or a wire coupled to the conductor.

In this example, the first magnetic array 611 is arranged at a position adjacent to the first coil 612. The first coil 612 and the magnet of the first magnetic array 611 may be, for example, spaced apart from each other.

FIG. 6B shows an example of the position alignment between the power receiving coil 110 and the power transmission coil 6.

In FIG. 6B, a schematic appearance of the power receiving coil 110 and the power transmission coil 6 is shown for the description in order to simplify the illustration.

Also, in FIG. 6B, in order to make the power receiving coil 110 and the power transmission coil 6 easier to view, these coils are spaced apart from each other to the extent that these coils do not overlap each other in the illustration.

In the present embodiment, the case where the configuration of the power transmission coil 6 is similar to the configuration of the power receiving coil 110 is described, but other configurations may be used as well.

FIG. 6B shows an example of the arrangement relationship between the power receiving coil 110 and the power transmission coil 6.

The power transmission coil 6 is configured with a combination of a second coil 621 and a second magnetic array M1 or the like. The second coil 621 and the second magnetic array M1 in the power transmission coil 6 correspond to the first coil 612 and the first magnetic array 611 in the power receiving coil 110.

When contactless power feeding from the power transmission coil 6 to the power receiving coil 110 is performed, the planar surface of the power transmission coil 6 and the planar surface of the power receiving coil 110 face each other.

Also, in this example, the first magnetic array 611 of the power receiving coil 110 and the second magnetic array M1 of the power transmission coil 6 are positioned by the magnetic attraction force between the two in such a way as to face each other exactly. Thus, the first coil 612 of the power receiving coil 110 and the second coil 621 of the power transmission coil 6 are positioned in such a way as to face each other exactly.

As the configuration for the position alignment between the power receiving coil 110 and the power transmission coil 6, other configurations may be used.

When contactless charging is performed without the position alignment between the power transmission coil 6 and the power receiving coil 110, the coil positions may not be aligned with each other, and the power loss may increase due to the position misalignment between the coils, and heat may thus be generated.

In contrast, when the power transmission coil 6 and the power receiving coil 110 are aligned in position by the magnet, the positional relationship between the coils can be optimally arranged, for example, without the user being aware of the positions of the coils.

As described above, in the mobile printer 1 according to the present embodiment, the power receiving coil 110 is provided on the side of the belt clip 313, thus enabling contactless power feeding with the belt clip 313 left attached, and the restriction on the arrangement of the power receiving coil 110 can thus be eliminated.

With the mobile printer 1 according to the present embodiment, for example, not only a form of use in the state of being installed on a floor but also a form of use in the state of being attached to pants or the like using the belt clip 313 is assumed. Therefore, when contactless power feeding is employed for the mobile printer 1 and the power receiving coil 110 is provided, for instance, at the second surface 102 of the case 311, it is conceivable that the position of the belt clip 313 and the position of the power receiving coil 110 may interfere with each other, but the present embodiment can solve such a problem.

The attitude in which the mobile printer 1 is used is not particularly limited, and for example, the mobile printer 1 may be placed on a desk or the like in the state where the second surface 102 with the battery provided thereat is the lower surface, or the mobile printer 1 may be used in an attitude in which the sixth surface 106 or the fifth surface 105 of the mobile printer 1 is the upper surface in the state where the belt clip 313 is used.

As an example of configuration, a printing device includes the case 311, the cover 312, the battery housing unit 70, the battery, the belt clip 313, and the power receiving module 11.

In the present embodiment, the small mobile printer 1 is an example of the printing device. In the present embodiment, the battery module 13 is an example of the battery.

The case 311 has the roll paper housing unit 60 in which a roll paper is housed.

The cover 312 is coupled to the case 311, and opens and closes the roll paper housing unit 60.

The battery housing unit 70 is formed in the case 311.

The battery is housed in the battery housing unit 70.

The belt clip 313 is attached to the case 311.

The belt clip 313 includes the power receiving module 11, which receives the power transmission signal Vpt from outside by contactless power feeding and feeds power to the battery.

Therefore, in the printing device, since the power receiving coil 110 of the power receiving module 11 is provided at the belt clip 313, the restriction on the arrangement of the power receiving coil 110 can be eliminated.

In the printing device, for example, a power-receivable region is provided on the side of the belt clip 313.

The power-receivable region is a region where power can be received from the power transmission coil 6 in a contactless manner by the power receiving coil 110 of the power receiving module 11, and may be, for example, a region near the surface of the belt clip 313 on the −Z side.

Also, in the printing device, since the power receiving coil 110 is provided at the belt clip 313, for example, the need to remove the belt clip 313 at the time of contactless charging can be eliminated.

The roll paper R housed in the roll paper housing unit 60 is drawn out to be the recording paper P.

Also, in the present embodiment, the opening 44 exists through which to draw out the recording paper P from the roll paper even when the cover 312 is open in relation to the case 311.

Also, the power receiving coil 110, for example, may be built inside the belt clip 313 or may be provided at the outer surface of the belt clip 313. In the present embodiment, the power receiving module 11 or at least the power receiving coil 110 of the power receiving module 11 is provided inside the belt clip 313 or at the outer surface on the −Z side or the outer surface on the +Z side. In this case, the power receiving module 11 or at least the power receiving coil 110 of the power receiving module 11 may be regarded as being unified with the belt clip 313.

The belt clip 313 may be increased in size because the power receiving coil 110 is built therein or the like, and in this case, the coil surface for contactless charging in the belt clip 313 can be a wide flat surface, and a stable surface can be secured when the printing device is placed on a desk or the like.

For example, it is conceivable that the printing device may be used not only in a portable use but also by being placed on a flat surface such as on a desk, like a stationary printer. In this case, when the printing device is installed on a desk or the like via the belt clip at the time of installation, this may result in unstable installation, but an increase in the size of the belt clip 313 can secure a stable installation state.

When power feeding from the power transmission coil 6 to the power receiving coil 110 is performed, for example, the power transmission coil 6 or the unit part including the power transmission coil 6, and the outer surface of the belt clip 313, may be not in contact with each other or may be in contact with each other. The distance between the power transmission coil 6 and the power receiving coil 110 is set to be a distance that enables proper power transmission and reception.

As an example of configuration, in the printing device, the belt clip 313 is coupled to the case 311 at the second surface 102, which is a case second surface different from the seventh surface 511, which is a case first surface where the cover 312 is arranged in relation to the case 311.

Therefore, in the printing device, the power receiving coil 110 of the power receiving module 11 and the battery are arranged at different surfaces, and the power receiving module 11 and the battery are coupled to each other without passing through the cover 312. Thus, in the printing device, for example, the wiring path of the first wiring 412 can be made shorter than the wiring path in the case where the belt clip is coupled to the cover 312.

However, the configuration according to this example of configuration may not necessarily be used.

As an example of configuration, in the printing device, the belt clip 313 is attachable and removable.

Therefore, in the printing device, the user can easily remove and attach the belt clip 313 according to need, and the convenience for the user can be improved.

When the power receiving coil 110 is provided at the belt clip 313, for example, a contact terminal may be provided at each of the belt clip 313 and the case 311, and when the belt clip 313 and the case 311 are attached to each other, the contact terminals may be electrically coupled to each other.

However, the configuration according to this example of configuration may not necessarily be used.

As an example of configuration, in the printing device, the belt clip 313 is provided with a positioning member that can be coupled to the first magnet of the power transmission coil 6 generating the magnetic field Pmg based on the power transmission signal Vpt.

In the example shown in FIG. 6B, the second magnetic array M1 of the power transmission coil 6 is an example of the first magnet, and the first magnetic array 611 of the power receiving coil 110 is an example of the positioning member.

Therefore, in the printing device, the power transmission coil 6 and the power receiving coil 110 can be easily aligned in position with each other, using the magnet, and for example, even when the cover 312 is the upper surface, the need to reverse the printing device to perform contactless charging can be eliminated.

In the example shown in FIG. 6B, the case where the positioning member of the power receiving coil 110 is formed of a magnet is described, but the positioning member may also be formed of a metal.

In this example, the case where the positioning member is provided in the power receiving coil 110 is described, but as another example, the positioning member may be provided in the belt clip 313.

However, the configuration according to this example of configuration may not necessarily be used.

As an example of configuration, in the printing device, the belt clip 313 is provided with the protection cover 321.

Therefore, in the printing device, the first wiring 412 between the power receiving coil 110 of the power receiving module 11 and the battery can be shortened, and the transmission loss can be suppressed.

In the printing device, for example, the first wiring 412 coupling the power receiving module 11 and the battery may be provided between the belt clip 313 and the protection cover 321.

However, the configuration according to this example of configuration may not necessarily be used.

As an example of configuration, in the printing device, the first coupling position 313*a* of the belt clip 313 to the case 311 does not overlap the battery when viewed from the insertion-extraction direction of the battery in relation to the case 311.

Therefore, the printing device is configured in such a way that the coupling point of the belt clip 313 to the case 311 does not overlap the battery, and the belt clip 313 can thus be prevented from interfering with the insertion and extraction of the battery.

Also, in the printing device, the first wiring 412 between the power receiving coil 110 of the power receiving module 11 and the battery can be shortened, and the transmission loss can be suppressed.

However, the configuration according to this example of configuration may not necessarily be used.

In the present embodiment, the case where the belt clip 313 is attached to the −X side of the case 311 in the X direction is described, but as another example, a configuration where the belt clip 313 is attached to the +X side of the case 311 may be used. In this case, for example, the power receiving coil 110 and the battery are close to each other, and the shortest distance between the coupling position of the belt clip 313 to the case 311 and the battery is shorter than the shortest distance between the coupling position of the belt clip 313 to the case 311 and the roll paper housing unit 60. Thus, the first wiring 412 between the power receiving coil 110 of the power receiving module 11 and the battery can be shortened, and the transmission loss can be suppressed.

While some embodiments have been described in detail with reference to the drawings, the specific configurations are not limited to the embodiments, and include designs and the like without departing from the scope of the present disclosure.

APPENDIXES

Configuration Examples 1 to 6 will now be described.

A lower-order configuration example may or may not be applied to a higher-order configuration example.

Also, a lower-order configuration example applicable to one of two or more higher-order configuration examples may be applied to any configuration example of the two or more higher-order configuration examples, and when there are two or more application examples in this way, a lower-order configuration example further below the foregoing lower-order configuration example may be applied to any application example of the two or more application examples.

Configuration Example 1

A printing device includes: a case having a roll paper housing unit in which a roll paper is housed; a cover coupled to the case and opening and closing the roll paper housing unit; a battery housing unit formed in the case; a battery housed in the battery housing unit; and a belt clip attached to the case, the belt clip including a power receiving module that receives a power transmission signal from outside by contactless power feeding and feeds power to the battery.

Configuration Example 2

In to the printing device according Configuration Example 1, the belt clip is coupled to the case at a case second surface different from a case first surface where the cover is arranged in relation to the case.

Configuration Example 3

In the printing device according to Configuration Example 1 or Configuration Example 2, the belt clip is attachable and removable.

Configuration Example 4

In the printing device according to one of Configuration Examples 1 to 3, the belt clip is provided with a positioning member that can be coupled to a first magnet of a power transmission coil that generates a magnetic field based on the power transmission signal.

Configuration Example 5

In the printing device according to one of Configuration Examples 1 to 4, the belt clip is provided with a protection cover.

Configuration Example 6

In the printing device according to one of Configuration Examples 1 to 5, a first coupling position of the belt clip to the case does not overlap the battery when viewed from an insertion-extraction direction of the battery in relation to the case.

What is claimed is:

1. A printing device comprising:
    a case having a roll paper housing unit in which a roll paper is housed;
    a cover coupled to the case and opening and closing the roll paper housing unit;
    a battery housing unit formed in the case;
    a battery housed in the battery housing unit, the battery being attachable to and removable from the battery housing unit in an insertion-extraction direction;
    a belt clip coupled to the case at a first part of a case second surface different from a case first surface where the cover is arranged in relation to the case, the belt clip including a power receiving module that receives a power transmission signal from outside by contactless power feeding and feeds power to the battery; and
    a controller to which a power from the battery is output and which outputs a signal,
    the roll paper housing unit being arranged between the belt clip and the cover when viewed from the insertion-extraction direction,
    the battery housing unit being a recessed space that is defined by a second part of the case second surface that is different from the first part of the case second surface, the second part of the case second surface being recessed relative to the first part of the case second surface in an insertion direction in which the battery is attached to the battery housing unit, the belt clip, the battery, and the controller being arranged such that a first coupling position of the belt clip to the first part of the case second surface does not overlap the battery and the controller when viewed from the insertion-extraction direction, and the battery overlaps the controller when viewed from the insertion-extraction direction.

2. The printing device according to claim 1, wherein the belt clip is attachable and removable.

3. The printing device according to claim 1, wherein the belt clip is provided with a positioning member that is connectable to a first magnet of a power transmission coil that generates a magnetic field based on the power transmission signal.

4. The printing device according to claim 1, wherein the belt clip is provided with a protection cover.

5. The printing device according to claim 4, wherein the power receiving module is attached to an outside of the belt clip, and the protection cover is a transparent cover that covers the power receiving module.

* * * * *